April 30, 1957     H. H. ZUR NIEDEN     2,790,673
EXPANSIBLE TRAILER STRUCTURE
Filed Jan. 27, 1955     3 Sheets-Sheet 1
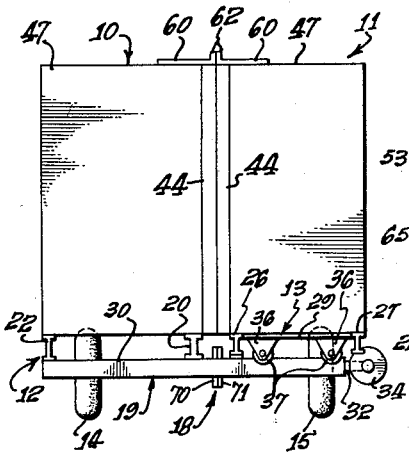
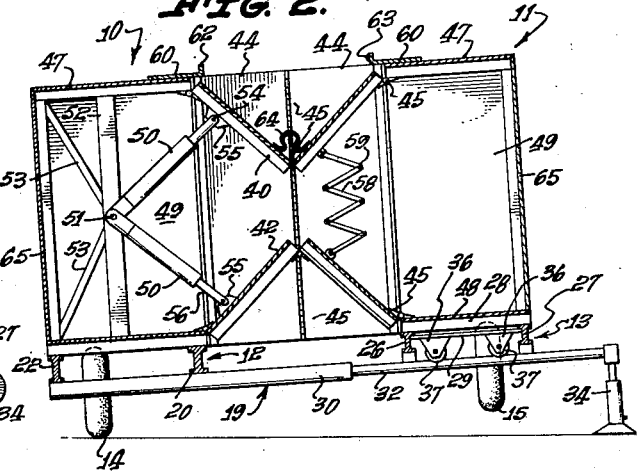
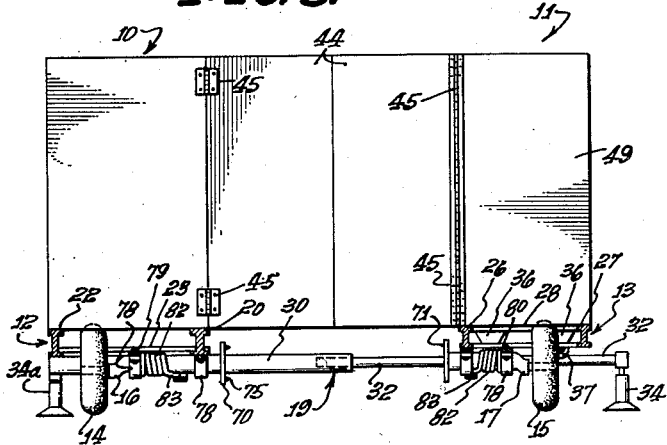
HARALD H. ZUR NIEDEN,
INVENTOR.
By His Attorneys.
HARRIS, KIECH, FOSTER & HARRIS.

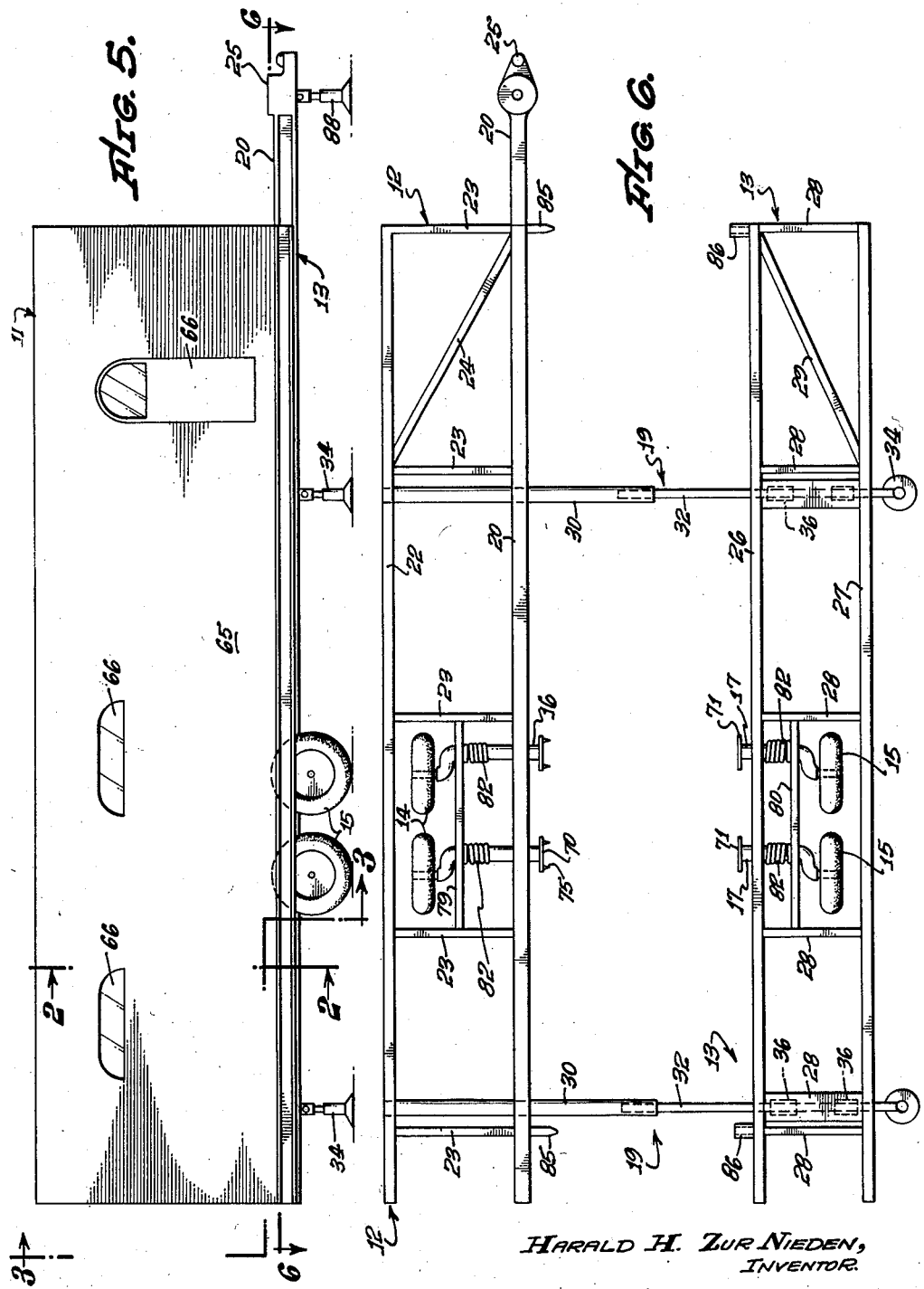

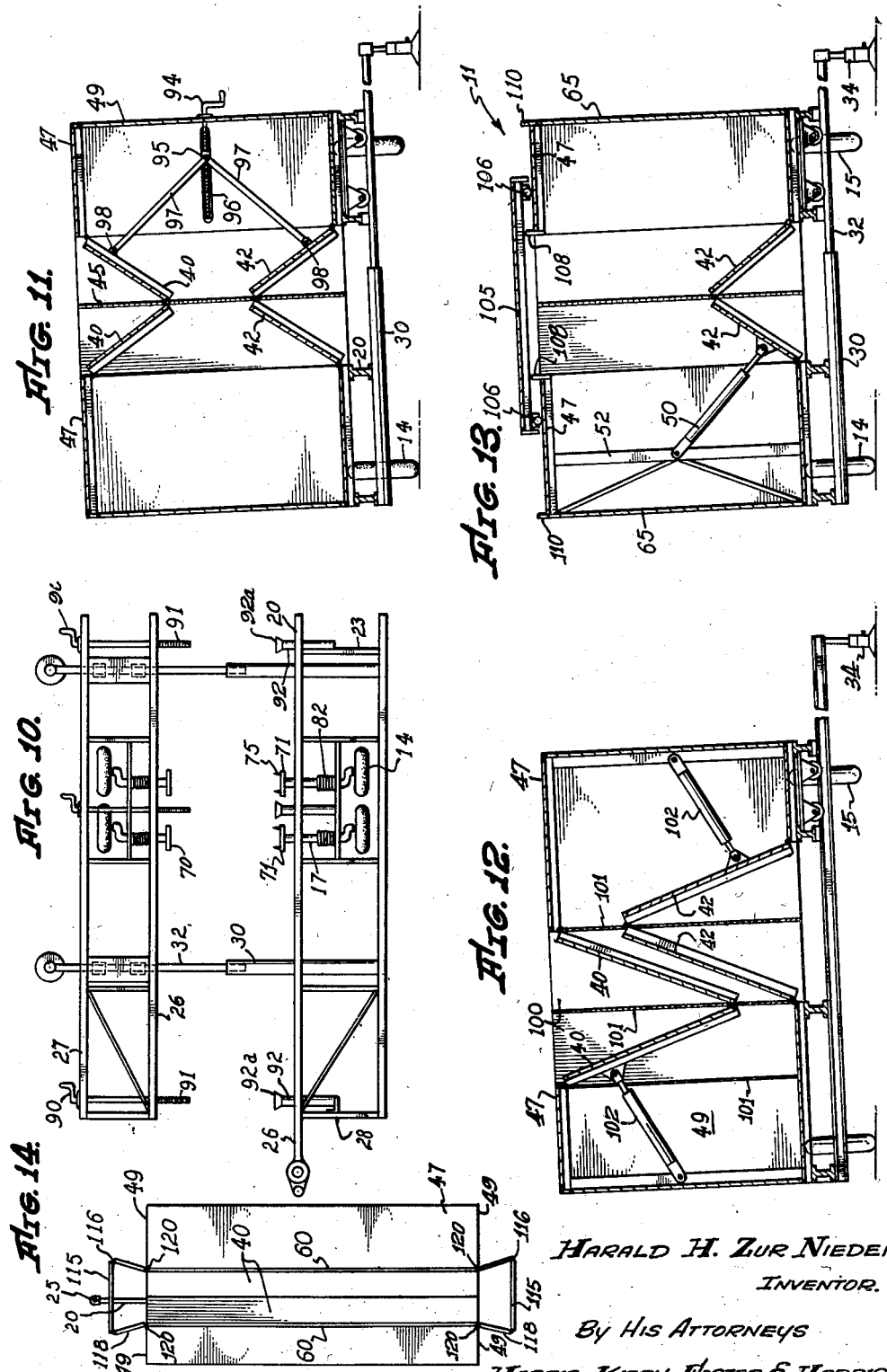

United States Patent Office 2,790,673
Patented Apr. 30, 1957

2,790,673

EXPANSIBLE TRAILER STRUCTURE

Harald H. Zur Nieden, South Pasadena, Calif.

Application January 27, 1955, Serial No. 484,475

5 Claims. (Cl. 296—23)

This invention relates principally to trailer structures adapted to be drawn by powered vehicles, and more particularly to trailer structures of the more spacious type carried on two or more ground wheels.

A particular object of this invention is to provide a structure of the house trailer type which may be easily expanded laterally so as greatly to increase the capacity thereof over its transport capacity, when such a trailer is to be employed for living purposes or the like. In other words it is an object of the invention to provide a trailer structure which may be easily expanded from a transport width of seven or eight feet to one perhaps double that width or even greater when set up in a stationary condition.

It is another object of the invention to provide a trailer structure in which laterally separable, elongated trailer units, each of which has a framework carrying one or more wheels, may have separable axle members for separation when the trailer is set up in expanded condition and which may be brought together and secured to provide spring-controlled or torsioned axle arrangements for the wheels which act to balance the load when traveling and automatically thereby to prevent swaying when uneven road conditions are encountered.

A further object of the invention is to provide simple and efficient means for elevating one of the lateral trailer units to cause its wheel or wheels to clear the ground, whereby to permit the elevated unit to be moved easily between collapsed transport position and expanded set-up or stationary housing position.

It is also an object of the invention to provide power means for separating opposed trailer units readily when the wheel or wheels at one side of the structure have been lifted from the ground, it being a further object to provide hingedly connected floor, roof and end strips or panels whose edges are in turn hingedly connected to permanent floor, roof and end walls, power means, such as hydraulic rams, being connected to some of such strips for actuation thereof to expanded position to enclose the expanded trailer.

Other objects of the invention, and various features of construction thereof, will be apparent to those skilled in the art upon reference to the following specification and accompanying drawings wherein certain embodiments of the invention are illustrated.

Fig. 1 of these drawings is a rear end elevation of an expansible trailer of this invention;

Fig. 2 is a vertical cross section of the trailer in partially expanded condition, such section being taken on the line 2—2 of Fig. 5;

Fig. 3 is a rear end elevation with portions of the framework broken away as indicated by the line 3—3 of Fig. 5;

Fig. 4 is a top plan view on a relatively small scale of the trailer in collapsed or transport condition;

Fig. 5 is a side elevation of the trailer in set-up position on jacks;

Fig. 6 is a plan view of the expanded framework showing the wheels, axles and jacks, the body portions of the two units being removed, and the view being indicated by the line 6—6 of Fig. 5;

Fig. 7 is an enlarged elevational detail, portions being broken away, of the separable joint between the two axle members for each pair of wheels when such axle members are bound together in transport condition as seen in Fig. 1;

Fig. 8 is a cross section on the line 8—8 of Fig. 7, the joint being shown in transverse elevation;

Fig. 9 is a view taken generally on the line 9—9 of Fig. 8, the axle members and one of the joint plates being however shown in elevation, this view being at right angles to the view of Fig. 7 which is taken from the line 7—7 of Fig. 8;

Fig. 10 is a plan view of the framework, similar to that of Fig. 6, and shows a modified form of centering or aligning means for the frameworks of the two trailer sections;

Figs. 11, 12 and 13 show in vertical cross section like that of Fig. 2 modified forms of roof and floor panel arrangements; and Fig. 14 shows in plan view a modified folding end-panel arrangement.

The particular embodiment of this improvement as disclosed in Figs. 1 to 9 includes two opposed, longitudinally extending house units 10 and 11 which are adapted to be brought together for transport purposes as indicated in Fig. 1 and are adapted to be extended to provide commodious living quarters or storage quarters as indicated in Fig. 3. One of the units, indicated as the unit 10, is desirably somewhat wider than the other unit in order to position on a median longitudinal axis a tongue member which will provide for even draft by a powered vehicle as presently to be described. The unit 10 is mounted on an elongated framework 12 best illustrated in Fig. 6, and the other unit 11 is mounted on a second elongated framework 13, the framework 12 being carried on a wheel or wheels 14 and the framework 13 being similarly carried on a wheel or wheels 15, each wheel 14 being carried on a special axle member 16 and each wheel 15 being carried on a special axle member 17, each pair of such axle members 16 and 17, which are sometimes referred to hereinafter as "half-axles" having their inner ends opposed and provided with connecting means for a fixed joint indicated at 18 (Fig. 1) required under transport conditions and adapted to be separated as seen in Figs. 3 and 6 when the trailer units 10 and 11 are expanded. Such half-axles and connecting members of the joint 18 will be more fully described below, as will aligned guide means generally indicated at 19 which provide for guided movement of the units 10 and 11 with their frames 12 and 13 between expanded and contracted positions.

As illustrated, the frame member 12 of the wider house unit 10 includes an inner, longitudinally extending beam or frame member 20 and an outer longitudinally extending frame member 22, these frame members 20 and 22 being rigidly connected together by means of transverse frame members 23 in such numbers as required together with frame braces 24 which are diagonally disposed and provided in such number as deemed necessary. The elongated frame member 20 extends sufficiently forward beyond the remainder of the frame 12 to provide at a sufficiently advanced position an appropriate trailer hitch 25 of any conventional or preferred construction. By making the framework 12 somewhat wider than the framework 13, the longer frame beam 20 is brought to the position of the longitudinal median axis of the structure when the trailer units are collapsed for transport purposes, whereas if the framework 12 and the framework 13 were of equal width, the line of draft by the longitudinal beam 20 would be off center and draft influences would not be equalized. All of the frame members 20, 22, 23 and 24 may be in the form of I-beams, channels or tubes, and the same is true of the members of the framework 13 which comprise an inner longitudinal beam 26, an outer longitudinal beam 27, cross beams 28 and diagonal brace beams 29 as required.

In order that the frame members 12 and 13 may be readily separated or brought together in proper guided alignment, the guiding structure 19 is provided, and preferably such a structure is employed in at least a forward position and a rearward position. As illustrated, each such guiding structure 19 is telescopic and includes a tube or outer sleeve member 30 which is rigidly fixed to the under side of the longitudinal beams 20 and 22, and a telescoping tube or rod member 32 most of which is adapted to be received in the tubular member 30 when in transport position as in Fig. 1 and to be moved outward to an extended position underlying the framework 13 of the unit 11 as illustrated in Fig. 2, and as also seen in Fig. 3.

In order to effect movement of the house unit 11 and its framework 13 outward into the positions of Figs. 2 and 3, the outer end of each telescoping rod member 32 is equipped, permanently or temporarily, with any convenient jack 34 such as the simple, well known hydraulic jack. Such jack 34 for each rod member 32 may be carried as a piece of equipment to be placed under the outer end of the telescoping rod 32 when required, or it may be attached to the outer end of the respective rod member 32 and be arranged to be swung up into a horizontal position during transport, somewhat as indicated in Fig. 1. When it is desired to expand the trailer from the position of Fig. 1 to that of Figs. 2 and 3, the rod 32 in each instance is drawn out from the tubular member 30 to approximately the position of Fig. 2, and the jack is placed in the operative position indicated and then actuated to raise the outer end of the telescoping rod 32 to free the wheels 15 from the ground as illustrated. Fixed to the framework 13 between its longitudinal rails 26 and 27 and in position directly overlying the respective telescoping rod member 32, there are provided plural brackets 36 which carry casters or pulley wheels 37 to bear upon the upper side of the respective rod 32. When each rod 32 is drawn out to the position of Fig. 2, it will in general travel within the concave portions of the pulley wheels 37. Also, when the house unit 11 and its framework 13 are moved outward into expanded position, the pulley wheels 37 (which have previously rested upon the upper side of the tubular member 30) will travel from such tubular member 30 onto the rod member 32 which forms a guiding track to direct the parts outward to the positions seen at the right of Fig. 3. The thickness of the cylindrical wall of the tubular member 30 is such that the pulley wheels 37 will readily travel from the tubular member 30 to the rod member 32, and in the reverse direction, whenever required, so that expanding and contracting movements may be readily accomplished. Having effected the expansion of the house unit 11, with respect to the house unit 10, the whole structure may if desired be set up in a relatively permanent condition by employing other jacks such as jacks 34a at the outer ends of the tubular members 30, approximately as illustrated at the left of Fig. 3. With the indicated construction the telescoping rod member 32 and the jack 34 primarily support the weight of the house unit 11, the wheels 14 supporting the house unit 10 when in the position of Fig. 2 and the jacks 34a supporting such portion of the trailer when in the position of Fig. 3. Jacks 34a may be incorporated to facilitate the change from expanded condition to contracted condition for transport, by taking the weight off the wheel or wheels 14, so that both wheels 14 and 15 will be without load and therefore both half axles 16 and 17 rotated in the same position. When the parts are returned to the collapsed position of Fig. 1, and the pulley wheels 37 travel back upon the upper side of the tubular telescope member 30, the rod member 32 is readily moved into telescoped position, and may be retained therein by any suitable means, such as that which will hold the jack 34 in approximately horizontal position, or otherwise as deemed satisfactory.

In order to effect enclosure of the enlarged space produced by expanding the trailer units 10 and 11 from the transport position of Fig. 1 to the extended position of Fig. 3, and also to facilitate such expansion, there are provided two hingedly connected longitudinally extending roof panels or strips 40 which drop downward when collapsed as indicated in Fig. 2, two similar longitudinally extending floor panels or strips 42 which rise upward when collapsed, as also indicated in Fig. 2, and two vertically extending hinged end strips 44 which fold at each end outwardly along the axis of travel as indicated in the plan view of Fig. 4. In all instances of the pairs of folding strips 40, 42 and 44, they are connected at their adjoining edges by means of hinges 45 which preferably are in the form of the well known piano hinges as seen at the right of Fig. 3 and which extend substantially the full length of the respective folding strips. Of course, if desired for any reason, shorter separated hinges might be used as seen at the left of Fig. 3. Such hinges are also employed to connect the outer edges of the respective strips 40, 42 and 44 to the adjacent edges of the fixed walls of the house trailer units 10 and 11. In other words, the outer edges of the hinged roof strips 40 are hingedly connected to the top or roof walls 47 of the two units 10 and 11, the outer edges of the floor strips 42 are hingedly connected to the inner edges of the adjacent bottom or floor walls 48 of the units, and the hingedly connected and mounted end strips 44 have their outer edges hinged to the adjacent inner edges of the end walls 49 of the house units 10 and 11.

In order to actuate the pairs of folding strips 40, 42 and 44 and to extend the house unit 11 outwardly with respect to the unit 10, power means are employed which are shown as being in the form of hydraulic or pneumatic rams 50 shown in Fig. 2 and mounted on the inner faces of the end walls 49 of the wider house unit 10. There is provided at each end of the trailer, as illustrated, a pair of rams 50 whose inner ends are pivotally mounted at 51 on an upstanding stud member 52 which may be appropriately braced by diagonal members 53. The opposite ends of the hydraulic rams 50 are shown as being pivotally attached at 54 to hinged brackets 55 carried on the inner walls of the respective roof strip 40 and floor strip 42. Such rams are actuated by any preferred source of fluid under pressure as well understood, or otherwise as desired. In the form shown, when the rams 50 are actuated for elongation thereof, their piston rods 56 move outward to swing floor strips 42 downward and the roof strips 40 upward. By reason of the connections of the floor strips 42 and the roof strips 40 hingedly to the floors 48 and the roof members 47 of the house units 10 and 11, such connections result in automatic movement of the house unit 11 laterally along the telescopic guide members 30 and 32 with respect to the house unit 10, until the fully extended position of Fig. 3 is attained. Also, rams 50 may be carried by partitions 57 (Fig. 4).

By the above operation, the house units 10 and 11 are not only expanded to the position of Fig. 3 but the closure panels or strips 40, 42 and 44 are moved into flattened relationship to enclose the enlarged room produced within the trailer, the floor members 42 dropping to the level of the floors 48 of the units 10 and 11, and being thereby retained by the respective ram 50 and bracket 55, and the ceiling or roof units 40 being raised to the level of the roof members 47 of the units 10 and 11 and being there retained by the respective ram 50. In addition, as seen in Fig. 2, sectional folding partitions 58 with horizontal hinges 59 may be attached to the roof panels 40, and also the floor panels 42 if desired, whereby to fold or extend in conjunction with corresponding movement of such panels.

As seen in Fig. 1, the longitudinal joint at the middle of the roof formed by the roof members 47 is conveniently closed by means of plate-like members 60 secured in water-tight relation along the length of sections 10 and 11 and having portions 62 which abut when the units are collapsed for the purpose of travel. Since the tops of both trailer units 10 and 11 have the tendency to lean inward towards each other when the trailer is in contracted transport-condition, the members 60 and portions 62 serve also structurally as a support. In addition, one or both of the contact portions 62 may be provided with a rubber cushion 63 or the like which will be compressed and thereby completely seal the resultant elongated joint. Any appropriate means may be employed to seal along the longitudinally extending hinge 45 connecting the roof strips 40, such as by making the hinge 45 self-sealing through the medium of thin rubber strips 64 or the like. Actuation of the sealing plates 60 to the closed or sealing position of Fig. 1 and collapsing of the two units 10 and 11, and the closure strips 40, 42 and 44 is easily effected by reversing the above described operation of the rams 50.

It is to be noted that with the present construction and arrangement for collapsing the units 10 and 11 to the traveling position of Fig. 1 and for expanding them to the extended, more permanent position of Fig. 3, there is no necessity whatsoever of disturbing fixtures of any type, such as fixed furniture, cabinets, stoves, refrigerators and the like, in order to place the trailer in either its collapsed or its expanded position. It will be apparent that appropriate vertical walls of the two units 10 and 11, such as their vertical side walls 65, may be provided with suitable doors and windows such as indicated at 66 in Fig. 5.

With respect to the particular axle construction carrying the wheels 14 and 15 and embodying the axle members 16 and 17 and the connecting joint 18, the inner ends of these half-axle members 16 and 17 for each pair of opposed wheels are themselves aligned so as to bring respective connecting flanges 70 and 71 into abutting relationship, as best indicated in Figs. 7 and 9. These flanges 70 and 71 are respectively fixed, as by welding or the like, to the opposed ends of the half-axle members 16 and 17. As best seen in Fig. 7, the flanges or collars 70 and 71 are drilled in positions to be properly aligned and to receive anchoring bolts 72. In addition, one of the flanges or collars, such as the collar 71, is apertured as at 74 to receive opposed centering studs 75 carried by the flange or collar 70. Thus, when the house units 10 and 11 are moved from the expanded position of Figs. 2 and 3 to the collapsed, traveling position of Fig. 1, the bolt holes in the collar 70 and 71 are readily aligned through the medium of the tapered studs 75 and the respective apertures 74, whereupon the bolts 72 are readily inserted and tightened, thereby clamping the collars 70 and 71 together and providing a fixed and operative traveling joint.

The above described, properly alignable joint between the collars 70 and 71 and the abutting half-axle members 16 and 17 lends itself admirably to the efficient employment of a particular type of torsioned, compensating axle produced through the half-axles 16 and 17 when so coupled together. With this particular structure the two half-axle members 16 are journaled in the inner longitudinally extending I-beam 20, or, as shown, in bearings 78 clamped to the under sides of such beam 20 and also to the under side of a short beam 79 paralleling the beam 20 and interposed between corresponding cross beams 23. A similar situation exists with respect to the wheels 15 and their half-axles 17 which are journaled on the inner longitudinal beam 26 and a spaced parallel short beam 80.

In the case of each of the four half-axles 16 and 17 shown, these are preferably of the offset type best illustrated in Fig. 6 wherein the half-axle is in the form of a bellcrank and the full axle when bound together is in the form of a double bellcrank, the spindle portions carrying the wheels 14 and 15 being eccentric to the axis of the axles journaled on the respective beam members. To make this axle structure effective, heavy torsion springs 82 are mounted about their axes of rotation, one end of each spring being fixed to the bearing in the adjacent beam 79 or 80, and the other end of each spring being fixed to the axle itself, in some such manner as indicated at 83 in Fig. 3. Thus, the loads of the wheels are taken by the heavy torsion springs 82, and when the collars 70 and 71 are properly centered and bolted together as indicated in Fig. 7, the two torsion springs 82 of each opposed pair of wheels tend to offset each other in the event of load fluctuation between the two opposed wheels. The double offset or bellcrank axle is a well known construction, including the employment of the heavy torsion springs 82, but the splitting of such axle and the employment of the joints 18 for binding the half axles together through the medium of the anchor bolts 72 inserted in the aligned bolt holes in the collars 70 and 71 whereby to use such torsion spring axles in expandable trailers is an innovation. Other appropriate locking means may replace the anchor bolts 72.

In addition to the means for aligning the two units 10 and 11 when contracted for travel purposes by relying upon the centering studs 75, the receiving apertures 74 therefor, and the telescopic members 30 and 32, it may be desirable to provide at both ends of the frames 12 and 13 additional aligning means. Thus, projections 85 extend inward from the elongated center beam 20 opposite the end cross beams 23, and receiving socket members 86 may project inward from the longitudinal beam 26 of the frame 13 opposite the end cross beams 28 to receive the centering projections 85. In addition to the previously described jacks 34 and 34a used for raising the trailer structure as indicated in Figs. 2 and 3, an additional jack 88 may be mounted at the under side of the hitch connection 25 carried on the forward end of the elongated center beam 20 whose extension provides a tongue carrying the hitch 25.

Instead of using the aligning means 85, 86 just above described, it may in some instances be very desirable to use somewhat modified aligning means as shown in Fig. 10. Such means include hand cranks 90 rotatably mounted in the frame members 26 and 27 but preferably retained against longitudinal movement, such cranks 90 having their inner ends threaded at 91 where they project from the member 20, such threaded ends 91 to be received within internally threaded socket members 92 which are secured to adjacent frame portions 20 and 23 and have their inner ends cupped or flared at 92a to guide the threaded ends 91 into position to thread into the socket members 92 when the two frame units are being collapsed.

In Fig. 11 there is illustrated a possible modification of the actuating means for raising and lowering the roof sections and floor sections 40 and 42 respectively. This includes a hand crank 94 mounted on the respective end wall 49 of the trailer unit, this hand crank operating a slide 95 which moves in a guide 96 on the end wall 49, the slide having pivotally connected thereto actuating arms 97 whose outer ends are pivoted at 98 to the adjacent roof and floor sections 40 and 42. Thus, by operating the hand crank 94 to move the slide 95 along the guide 96, the arms 97 move the roof and floor sections between their operative and inoperative positions as will be apparent.

In Fig. 12 there is shown a possible variation for the positioning of the roof sections 40 with respect to the floor sections 42. In this arrangement the roof sections 40 are offset somewhat to one side from the floor sections 42 when folded so that the panels which constitute these sections may be very much wider than illustrated in Fig. 2, and therefore, when collapsed, will have their inner portions lying alongside one another instead of being opposed at the hinged edges thereof as required with the construction of Fig. 2. As shown in Fig. 12, end panels 100 are hingedly connected together and hingedly mounted on the end walls 49 of the trailer units, as seen for example at 101. These sectional end panels 100 assume much the same relationship as the sectional end panels 44 seen in Fig. 4 when the trailer units are collapsed, with the difference that their fold lines are offset laterally from the median line of the trailer as a whole. However, these roof and floor panels are actuable in the same manner as are the other forms, for example by hydraulic rams 102 corresponding with the previously described rams 50.

In Fig. 13 a modified roof structure is illustrated. In this instance it is not necessary to employ the previously described roof panels 40, although the same floor panels 42 are used, these being actuable by the same rams 50, or crank means 94, 95 as described in connection with Fig. 11. As to the roof, this is in the form of a unitary roof panel 105 which is provided at its opposite edges with rollers or wheels 106 which travel along the roof tops of the two collapsible trailer units 10 and 11. Upstanding guards 108 serve the dual purpose of preventing rain from flowing over the roof edges to the interior of the trailer and of limiting the movement of the respective rollers or wheels 106 along the roof tops as the trailer is being expanded. Similarly the side walls 65 of the two trailer units 10 and 11 are provided with upwardly directed extensions or guards 110 which limit the movement of the wheels or rollers 106 along the roof tops when the trailer is being collapsed. As a consequence, the roof unit 105 is properly centered in both the extended and collapsed positions of the trailer.

In Fig. 14 there is illustrated a plan view of a modified folding, sectional end panel arrangement, the corresponding end panels being shown in an intermediate position. With this construction there is disposed at each end of the trailer three end panels, the middle one of which is designated 115 and is hingedly connected at 116 to narrower lateral panels 118 which are hingedly connected at 120 to the permanent end panels or walls 49 of the two trailer units. Thus, when the trailer is collapsed, the narrow lateral panels 118 fold against the outer faces of the end walls 49 and the middle panel 115 folds flat against the lateral panels 118. For this purpose, the width of the middle panel 115 equals the combined widths of the narrow panels 118. This avoids the rearward projection of the two folded panel units 44 seen in Fig. 4. When the trailer is expanded, the panels 115 and 118 fill an opening equal in width to the combined widths of the two panels 118 and the middle panel 115.

From the foregoing it will be apparent that I have provided a construction for house trailers and the like with which expansion of such a trailer laterally may be readily effected whereby to increase greatly the usable space, such enlarged space being automatically enclosed by the elongated hinged roof strips, floor strips and end strips, the structure being similarly automatically placed in contracted position for travel when required, relatively simple and adequate means being employed for guiding the two expandable units between traveling position and housing position, and in which structure the wheels remain in their normal position with respect to their individual frames and house units by reason of the fact that axles are employed which may be disconnected and rigidly connected together again as needed.

I claim as my invention:

1. An expansible house trailer structure including: two laterally movable, opposed, longitudinal house units having connecting frame means and adapted to be laterally collapsed for transport, each unit having side, end, floor and roof walls; longitudinally extending auxiliary roof strips movably connected together and to inner edges of the respective roof walls to fold down into the interior space of the trailer for transport and to be elevated to expanded roof position when the trailer is laterally expanded for house use; movably connected end strips at each end of the trailer, such end strips having edges movably attached to inner edges of the respective end walls of said units to fold into collapsed position for transport and to extend flat for house use; and longitudinally extending floor strip means adapted to be folded up within the trailer when collapsed for transport and to lie flat for house use.

2. A structure as in claim 1 wherein said roof strips, end strips and floor strip means are in each instance plural strips hinged together along adjacent edges and hinged at opposite edges to opposing edges of the respective walls.

3. A structure as in claim 2 including fluid-operated rams connected to said hinged roof strips and floor strip means to move the strips between collapsed positions and extended positions whereby to expand and collapse said units.

4. A structure as in claim 2 including power means carried by certain of said walls and connected with certain of said strips to move said strips and said units between collapsed positions and expanded positions.

5. A laterally expansible house trailer structure including: two opposed elongated separable units; separate elongated opposed frames carrying said units; co-operating means carried by said frames for guiding the frames in movements between contracted and expanded positions; a wheel carried in a fixed position in each frame and movable with the respective frame; means for moving said units relative to each other between expanded and contracted positions; elongated floor strips hinged respectively at a longitudinal lower edge to said units, such floor strips being hinged to each other to fold together; elongated roofstrips hingedly connected respectively at one longitudinal upper edge to said units, such roof strips being hingedly connected to each other to fold together when collapsed, the locus of the folded roof strips being offset laterally from the locus of the folded floorstrips whereby, when said trailer units are collapsed, said folded roof strips are disposed laterally of said folded floor strips.

References Cited in the file of this patent

UNITED STATES PATENTS

| 2,202,747 | Roloson | May 28, 1940 |
| 2,225,319 | Rollo | Dec. 17, 1940 |
| 2,248,080 | Hathaway | July 8, 1941 |
| 2,306,084 | Rollo | Dec. 22, 1942 |
| 2,318,802 | Reid | May 11, 1943 |
| 2,681,231 | Kondracki | June 15, 1954 |
| 2,732,251 | Meaker | Jan. 24, 1956 |

FOREIGN PATENTS

| 1,015,333 | France | July 9, 1952 |
| 285,325 | Switzerland | Jan. 5, 1953 |